Figure 1:
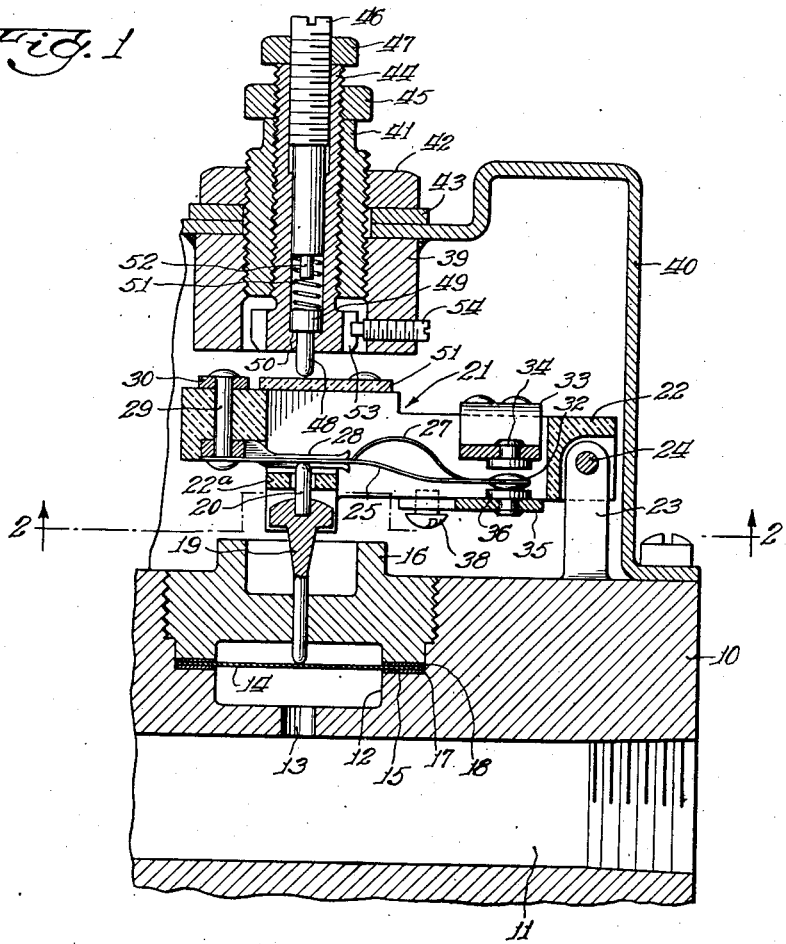

Aug. 6, 1946.　　　R. G. HOLT　　　2,405,142
PRESSURE SWITCH
Filed Oct. 6, 1943

Inventor:
Ray G. Holt
By Edward C. Gritzbaugh
Atty.

Patented Aug. 6, 1946

2,405,142

UNITED STATES PATENT OFFICE 2,405,142

PRESSURE SWITCH

Ray G. Holt, Euclid, Ohio, assignor to Pesco Products Co., Cleveland, Ohio, a corporation of Ohio Application October 6, 1943, Serial No. 505,104

4 Claims. (Cl. 200—83)

My invention relates to electric switch arrangements and more particularly to such arrangements which are responsive to changes in fluid pressure.

Unloading valve arrangements for fluid pumps which are adapted for maintaining fluid under pressure in a fluid accumulator between selected maximum and minimum pressures may preferably comprise a pressure responsive diaphragm of thin sheet metal, an electric switch actuated by the diaphragm, and an electric operator for an unloading valve controlled by said switch. Such an unloading valve arrangement is shown in my co-pending application, Serial No. 505,103, filed October 6, 1943. The pressure responsive diaphragm has a very small movement under the smallest changes in fluid pressure with which it is desired that the switch may open and close, and an electric switch providing a snap action and actuated by movements of an operator of the same order of magnitude is preferably used in conjunction with the diaphragm.

It is one of the objects of my invention to provide an improved fluid pressure responsive switch arrangement, useful in such unloading valve arrangements and comprising such a diaphragm and switch, which is so arranged that the diaphragm may move through a greater distance to actuate the switch than that distance a switch operator moves with respect to the switch itself to actuate the switch, whereby the differential between the switch actuating fluid pressures is increased.

It is a further object of my invention to provide an adjustment for varying the distance the pressure responsive diaphragm shall move to open and close the switch whereby to adjust the differential between the switch actuating fluid pressures. To these ends it is an object of my invention to provide a pivotal mounting for the snap action switch whereby the switch may move along with the movement of the diaphragm due to changes in fluid pressure thereon, a spring actuated member for restraining such movement of the switch and an adjustment for varying the action of the spring on the switch restraining member.

It is another object of my invention to provide in such a fluid pressure responsive switch arrangement an adjustment whereby the values of fluid pressure at which the diaphragm is effective to open or close the switch may be simultaneously raised or lowered. To this end it is an object to provide an adjusting sleeve differentially threaded with respect to a stationary member and a movable member which carries the spring actuated member adapted to restrain movement of the switch, whereby the said movable member may be given a small movement toward or away from the switch with a comparatively large turning movement of the sleeve.

Figure 2:
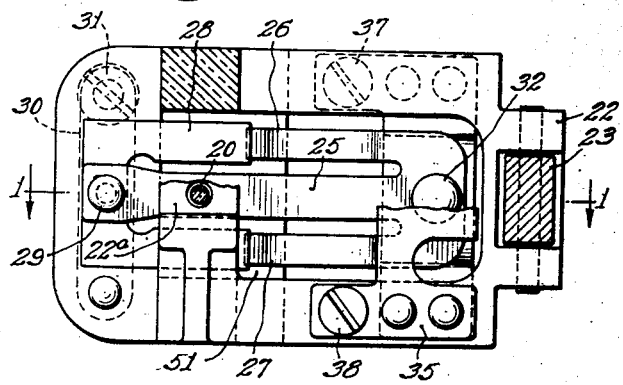

The invention consists of the novel constructions, arrangements and devices to be hereinafter described and claimed for carrying out the above stated objects and such other objects as will appear from the following description of a certain preferred embodiment illustrated in the accompanying drawing, wherein:

Fig. 1 is a vertical sectional view showing a pressure responsive switch arrangement embodying the principles of my invention; and Fig. 2 is a sectional view taken on line 2—2 of Fig. 1 in the direction indicated.

Like characters of reference designate like parts in the several views.

The illustrated embodiment of my invention comprises a casing member 10 which is illustrated only fragmentarily and may form a casing for an unloading valve (not shown). The casing member 10 is provided with a fluid conduit 11 extending therethrough and is provided with a chamber 12 which is in communication with the conduit 11 by means of a passage 13. A diaphragm 14 is disposed on a ledge 15 provided in the casing 10 about the chamber 12, and the diaphragm functions to close the chamber 12 as is apparent. The diaphragm 14 is of thin sheet metal, such as beryllium copper, spring steel or stainless steel, and the diaphragm is adapted to move, particularly at its center, in response to any changes in fluid pressure thereon, as is apparent. A cap member 16 is threadedly engaged with the member 10 in a cavity therein adjacent the chamber 12, and the cap member functions to hold the diaphragm 14 in place on the ledge 15. Annular washers 17 and 18 of any suitable yieldable material are preferably provided between the diaphragm 14 and the ledge 15 and between the diaphragm and the cap member 16 for effectively sealing the chamber 12. A pin 19 extends through and is slidably disposed in an appropriate opening through the cap member 16 such that the lower end of the pin is in contact with and rests on the diaphragm 14 at substantially its center. Another pin 20 is fixed in the pin 19, and both of the pins 19 and 20 move with the diaphragm 14 due to any changes in fluid pressure on the latter, as is apparent.

A snap action switch 21 is provided, and this switch is adapted to be actuated by the pin 20, as will be hereinafter described. The switch 21 comprises a switch body 22 of insulating material which is pivotally mounted at one end thereof with respect to the casing member 10 by means of a lug 23 on the casing member and a pin 24 extending through the lug and the switch body. A thin leaf spring 25, which is provided with spring arm portions 26 and 27 formed integrally with the leaf spring at one end thereof and extending parallel thereto, is fixed at its other end to the switch body 22 adjacent the free end of the switch body. The leaf spring 25 is disposed on a U-shaped element 28, and a rivet 29 functions to fix both the member 28 and the leaf spring 25 to the switch body. A member 30 having a terminal screw 31 for connecting a suitable electric lead with the member 30 is also fixed with respect to the switch body 22 by means of the rivet 29, as shown. A contact 32 is provided on the free end of the leaf spring 25, and this contact is connected with the terminal 31 through the spring 25 and the rivet as is apparent. The member 28 on its ends, which are disposed at points intermediate the ends of the spring arm 25, is provided with notches for receiving the ends of the spring arm portions 26 and 27, and the arm portions 26 and 27 may pivot in these notches, as is apparent.

A plate 33 which is U-shaped in longitudinal cross-section and carries a contact 34 is fixed on the upper surface of the switch body 22. Another plate 35 carrying a contact 36 is fixed on the lower face of the switch body 22 as shown. The plate 33 is provided with a terminal screw 37 and the lower plate 35 is provided with a terminal screw 38 for connecting suitable electric leads with these plates. Both of the contacts 34 and 36 are adapted to make contact with the contact 32 carried by the leaf spring 25, and the former contacts also act as stops for limiting the movement of the contact 32 and the leaf spring 25.

The pin 20 extends loosely through an appropriate opening in a portion 22a of the switch body 22, and the pin is adapted to apply pressure to and move the leaf spring 25 at a point thereon adjacent its fixed end. The switch 21 is so arranged that when the pin 20 applies substantially no pressure to the spring 25, the parts of the switch are substantially in their relative positions as shown in the drawing with the contact 32 in contact with the lower contact 36. When, however, the pin 20 applies pressure to and moves the portion of the leaf spring 25 it is adapted to contact, then after a small predetermined movement of the pin and this portion of the spring 25 relative to the switch 21 as a whole, the contact 32 moves away from the lower contact 36 with a snap action into contact with the upper contact 34. The contacts 32 and 34 remain in contact as long as the pin 20 continues to exert a sufficient pressure on the leaf spring 25. When the pin 20 is moved back to its original position with respect to the switch 21, the free end of the leaf spring 25 and the contact 32 move with a snap action to bring the contact 32 into its original position in contact with the lower contact 36. The leaf spring 25 has such a predetermined set that the contact 32 is in contact with the contact 36 when the pin 20 exerts no pressure on the leaf spring 25, and the spring arm portions 26 and 27 act as compression springs between the free end of the leaf spring 25 and the ends of the U-shaped member 28. The spring arm portions 26 and 27 thus function to hold the contact 32 forcefully in contact with either the contact 34 or the contact 36 to provide good electrical circuits, and the spring arm portions function also to provide the snap action of the contact 32 with respect to the contacts 34 and 36. With a certain embodiment of the switch 21, movement of the pin 20 through only substantially .001 inch with respect to the switch is sufficient for moving the contact 30 between its two positions.

The movement of the diaphragm 14 at its center, when the fluid pressure thereon is changed between the values at which it is generally desired to actuate the switch 21, is considerably greater than that necessary to move the contact 32 between its two positions. In a certain embodiment of the invention, the diaphragm 14 at its center moves substantially .030 inch between the fluid pressures on the diaphragm at which it is desired to actuate the switch 21. I, therefore, provide mechanism for causing the switch 21 to be actuated by a greater movement of the pin 20 than is sufficient for actuating the switch if the pin 20 is simply moving relative to the switch. The mechanism furthermore is adjustable to allow the differential between the values of fluid pressure actuating the switch 21 to be varied, as well as to allow the switch actuating values of fluid pressure to be either simultaneously increased or decreased.

This mechanism for the switch 21 comprises a member 39 fixed to a switch housing 40 which is in turn fixed to the casing member 10. Although the housing 40 is shown fixed to and supported by the casing member 10 only at one side of the housing, it will be understood that the housing may be suitably fixed to and supported by the member 10 at its other sides in any suitable manner. A sleeve 41 is in threaded engagement with the member 39, and a lock nut 42 is provided on the sleeve 41. A washer 43 is preferably provided between the nut 42 and the housing 40, and the lock nut 42 when tightened functions to fix the sleeve 41 with respect to the housing 40, as is apparent. A sleeve 44 is provided in threaded engagement with the sleeve 41, and a lock nut 45 is provided on the sleeve 44 for fixing the sleeve 44 with respect to the sleeve 41. An adjusting screw 46 is threaded in the sleeve 44, and a lock nut 47 is provided on the screw 46 for holding it against movement relative to the sleeve 44. It will be apparent that when all of the lock nuts 42, 45 and 47 are tightened on their respective threaded members, the lock nuts function to hold all of the members 41, 44 and 46 against rotative movement.

A plunger 48 is slidably disposed in the sleeve 44, and the plunger is provided with an enlarged end 49 adapted to cooperate with an internal shoulder 50 in the sleeve 44 for limiting the downward movement of the plunger as seen in Fig. 1. A compression spring 51 is provided between the plunger 48 and the screw 46, and the spring functions to urge the plunger 48 toward the switch 21. The switch 21 has fixed on its upper surface a plate 51 adapted to make contact with the plunger 48 on upward movement of the switch 21 about its pivotal mounting. The plunger 48, as may be seen from the drawing, makes contact with the plate 51 at a point substantially opposite the pin 20, and the plunger and spring 51 thus function to restrain the pivotal movement of the switch 21. The screw 46 is provided with a stud-like portion 52 on its lower end which is adapted to contact the top surface of the plunger 48 and which thus may be used, when the screw is adjusted downwardly in the sleeve 44, to prevent the plunger from moving upwardly in the sleeve off the ledge 50.

The sleeve 44 is provided at its lower end with a longitudinally extending slot 53, and a screw 54 extends through the member 39 and into the slot 53. The screw 54 functions, as apparent, to prevent any rotative movement of the sleeve 44 but to allow a longitudinal movement of the sleeve 44 toward or away from the switch 21. The threads on the outside of the sleeve 41 are of a different pitch than the threads on the inside of the sleeve. The sleeve 41 thus constitutes a differentially threaded adjusting member which must be given a relatively large rotative movement to move the sleeve 44 a relatively small distance toward or away from the switch 21.

In the operation of the illustrated fluid pressure responsive switch arrangement, fluid which varies in pressure is present in the conduit 11. The chamber 12 is in communication with the conduit 11 by means of the passage 13, and the fluid pressure is thus impressed on the diaphragm 14. As the pressure of the fluid in the conduit 11 increases, the diaphragm 14 is stressed to a greater and greater extent, and it moves the pins 19 and 20 upwardly and causes the switch 21 to pivot upwardly about the pin 24. After a certain amount of such movement, the plate 51 on the switch makes contact with the plunger 48, and the spring 51 then becomes effective to restrain movement of the switch. On further increases in fluid pressure on the diaphragm 14, the switch 21 is moved about its pivot still further, and both the spring 51 and the leaf spring 25 are put under compression. The leaf spring 25 at its point in contact with the pin 20 is moved through a certain distance under such compression, and when such movement becomes sufficient, the switch 21 is actuated and the contact 32 moves with a snap action into contact with the contact 34. On a decrease in fluid pressure on the diaphragm 14, the parts of the switch arrangement move in the opposite directions. When the point on the leaf spring 25 in contact with the pin 20 has moved in the direction away from the plate 51 sufficiently, the contact 32 moves with a snap action again into contact with the contact 36.

Both the value of fluid pressure at which the contact 32 moves into engagement with the contact 34 and also the value of fluid pressure at which the contact 32 moves into contact with the contact 36 may be simultaneously increased or decreased by suitably rotating the sleeve 41. When the sleeve 41 is rotated to move the sleeve 44 and thereby the plunger 48 upwardly, then the values of fluid pressure on the diaphragm 14 necessary to bring the contacts 32 and 34 together and to return the contact 32 to position in contact with contact 36 must be greater. When the sleeve 41 is rotated in the opposite direction, then these values of fluid pressure necessary for actuating the switch 21 are less. As has been hereinbefore mentioned, due to the differential threading on the sleeve 41, a relatively large rotation of the sleeve 41 produces a relatively small longitudinal movement of the sleeve 44, and the values of fluid pressure for actuating the switch 21 may thus be accurately and easily adjusted.

The differential between the values of fluid pressure on the diaphragm 14 necessary for first bringing the contacts 32 and 34 together and thereafter bringing the contacts 32 and 36 together may be increased or decreased by adjustment of the screw 46. When the screw 46 is turned so as to decrease the compression in the spring 51, then the switch 21 on an increase in fluid pressure may have a greater rotative movement about the pin 24 before the pin 20 acts with sufficient pressure to produce the necessary movement of the leaf spring 25 for closing the contacts 32 and 34. When the fluid pressure in the chamber 12 is decreasing, then the pin 20 has a greater movement before the pressure of the pin on the leaf spring 25 is decreased to allow a sufficient return movement of the leaf spring to permit the contacts 32 and 36 to move together. By this adjustment of the screw 46, the differential between the values of fluid pressure for actuating the switch 21 is thus increased. Conversely, when the screw 46 is adjusted to increase the compression in the spring 51, the plunger 48 allows less movement of the switch 21, and the difference of pressures by the pin 20 on the leaf spring 25 necessary to actuate the switch is obtained with less movement of the pin 20. By this adjustment of the screw 46, the differential between the fluid pressures for actuating the switch 21 is thus decreased. When the screw 46 is moved sufficiently in the latter direction to bring the stud portion 52 into contact with the plunger 48 when the plunger is resting on the shoulder 50, then the switch 21 can have no rotative movement about the pin 24 against the action of the spring 51, and the differential between the values of fluid pressure for actuating the switch is decreased to the minimum.

I wish it to be understood that my invention is not to be limited to the specific constructions and arrangements shown and described except only insofar as certain of the appended claims may be so limited, as it will be apparent that changes may be made without departing from the principles of the invention.

I claim:

1. In a fluid pressure responsive switch arrangement, the combination of means adapted to be in communication with fluid under pressure and movable with changes in such fluid pressure, an electric switch, means for transmitting movement from said first named means to said switch for opening the switch at a certain fluid pressure on said first named means and for closing the switch at another fluid pressure on said first named means, and means for simultaneously increasing or decreasing both the switch opening and switch closing fluid pressures and including means for permitting a movement of said switch as a whole along with movement of said first and second named means, a plunger opposite the movement transmitting means for restraining such movement of the switch, a support having a threaded aperture, telescoped sleeves threaded into said aperture, said sleeves having interior and exterior threads and the inner sleeve movably supporting said plunger, threaded means screwed into the inner sleeve, and a spring acting between said threaded means and said plunger for yieldably biasing said plunger against said switch.

2. In a fluid pressure responsive switch arrangement, the combination of a diaphragm adapted to be in communication with fluid under pressure and movable with changes in such fluid pressure, a snap action switch adapted to be actuated by movement of a certain portion thereof adjacent one end of the switch, a member having a portion guided by said switch for transmitting movement from said diaphragm to said certain switch portion for closing the switch at a certain fluid pressure on said diaphragm and for opening the switch at another fluid pressure on said diaphragm, and means for simultaneously increasing or decreasing both the switch opening and switch closing fluid pressures and including means for pivotally mounting said switch adjacent its other end whereby the switch may move along with movement of said diaphragm, a plunger for restraining such movement of said switch and a differentially threaded adjusting assembly yieldably supporting said plunger for effecting micro-movement of said plunger with respect to said switch, said assembly including means for adjustably tensioning said plunger against said switch opposite said movement transmitting member.

3. In a fluid pressure responsive switch arrangement, the combination of a diaphragm adapted to be in communication with fluid under pressure and movable with changes in such fluid pressure, a snap action switch comprising a switch body, a thin leaf spring supported at one end thereof by said body adjacent one end of the body, compression spring means pivoted at a point between the ends of said leaf spring and connected with the leaf spring at its free end, a contact on the free end of said leaf spring and a contact carried by said switch body adapted to cooperate with said first named contact to complete an electric circuit, said switch being so arranged that said contacts are brought together with a snap action when a certain portion of said thin leaf spring adjacent the fixed end of the spring is moved under pressure through a certain distance, a member for transmitting movement from said diaphragm due to changes in fluid pressure thereon to said certain portion of said leaf spring for actuating said switch, said switch body being pivotally mounted at its other end whereby it may have movement along with said member, and means for restraining such movement of said switch comprising a fixed interiorly threaded outer member, telescoped internally and externally threaded sleeves screwed into said fixed member, an adjusting screw turned into the inner sleeve, a plunger projecting out of the inner sleeve adapted to be engaged by said switch, and a spring between said screw and plunger for yieldably biasing said plunger towards said switch.

4. A fluid pressure responsive switch arrangement as defined in claim 3 wherein the switch is engaged with the plunger at a point opposite the movement transmitting member on the diaphragm, and the external and internal threads on the outer sleeve are of different pitch whereby the inner sleeve may be given a small movement toward or away from said switch by a comparatively large rotative movement of the outer sleeve.

RAY G. HOLT.